US006973474B2

(12) United States Patent
Hatayama

(10) Patent No.: US 6,973,474 B2
(45) Date of Patent: Dec. 6, 2005

(54) INFORMATION DISTRIBUTION APPARATUS THAT RESUMES DISTRIBUTION AFTER INTERRUPTION

(75) Inventor: Yoshinori Hatayama, Komaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 804 days.

(21) Appl. No.: 09/920,289

(22) Filed: Aug. 2, 2001

(65) Prior Publication Data

US 2002/0026644 A1 Feb. 28, 2002

(30) Foreign Application Priority Data

Aug. 2, 2000 (JP) .............................. 2000-234097
Aug. 1, 2001 (JP) .............................. 2001-233938

(51) Int. Cl.$^7$ ............................................. G06F 15/16
(52) U.S. Cl. ...................... 709/201; 709/203; 709/213; 709/232; 714/100
(58) Field of Search ................................ 709/230–235, 709/201–203, 213, 217–219; 714/100, 2, 714/6–8, 18

(56) References Cited

U.S. PATENT DOCUMENTS

| | | | | |
|---|---|---|---|---|
| 4,430,699 | A | * | 2/1984 | Segarra et al. ............... 709/230 |
| 5,768,528 | A | * | 6/1998 | Stumm ........................ 709/231 |
| 5,790,804 | A | * | 8/1998 | Osborne ...................... 709/245 |
| 5,841,974 | A | * | 11/1998 | Krone et al. ................. 709/201 |
| 6,044,305 | A | * | 3/2000 | Larson et al. ................ 709/201 |
| 6,049,892 | A | * | 4/2000 | Casagrande et al. .......... 714/18 |
| 6,098,180 | A | * | 8/2000 | Kobata et al. ................. 714/18 |
| 6,195,680 | B1 | * | 2/2001 | Goldszmidt et al. ......... 709/203 |
| 6,216,163 | B1 | * | 4/2001 | Bharali et al. ............... 709/227 |
| 6,229,990 | B1 | * | 5/2001 | Toshida ....................... 455/69 |
| 6,230,319 | B1 | * | 5/2001 | Britt et al. ................... 717/173 |
| 6,339,785 | B1 | * | 1/2002 | Feigenbaum ................. 709/213 |
| 6,363,411 | B1 | * | 3/2002 | Dugan et al. ................ 709/202 |
| 6,377,974 | B1 | * | 4/2002 | Feigenbaum ................. 709/203 |
| 6,381,709 | B1 | * | 4/2002 | Casagrande et al. .......... 714/18 |
| 6,779,030 | B1 | * | 8/2004 | Dugan et al. ................ 709/223 |
| 2002/0143901 | A1 | * | 10/2002 | Lupo et al. .................. 709/219 |

FOREIGN PATENT DOCUMENTS

| | | |
|---|---|---|
| JP | 7-6573 | 1/1995 |
| JP | 7-219970 | 8/1995 |
| JP | 07-219970 | 8/1995 |

(Continued)

OTHER PUBLICATIONS

The Japanese Office Action (a Notification of the Reasons for Objection) dated Aug. 31, 2004.

Primary Examiner—Bharat Barot
(74) Attorney, Agent, or Firm—Westerman, Hattori, Daniels & Adrian, LLP

(57) ABSTRACT

The invention relates to an information distribution apparatus capable of distributing multimedia information without fail even if interruption has arisen in real-time distribution of multimedia information. In the information distribution apparatus, distribution information serving as real-time information is received by the receiving end, while being stored in a storage section provided in the sending end. Even if distribution is interrupted in the course of distribution, a time stamp corresponding to the time at which interruption has arisen is stored. When a re-transmission request is issued by the receiving end, distribution information is loaded from a memory location corresponding to the time stamp, and the thus-loaded information is transmitted to the receiving end. In this case, the speed at which information is loaded from the storage section is increased so as to catch up with real-time distribution.

28 Claims, 8 Drawing Sheets

FOREIGN PATENT DOCUMENTS

| | | |
|---|---|---|
| JP | 8-263504 | 10/1996 |
| JP | 09-083955 | 3/1997 |
| JP | 9-149360 | 6/1997 |
| JP | 10-210419 | 8/1998 |
| JP | 11-273246 | 10/1999 |
| JP | 2000-23103 | 2/2000 |

* cited by examiner

Fig. 2

INTERRUPTION INFORMATION TABLE

| CLIENT ID | CONTENTS NO. | TIME STAMP | DISTRIBUTION END FLAG |
|---|---|---|---|
| ooooo | ooo | 10MIN. 00SEC. | OFF |
| . | . | . | . |
| . | . | . | . |
| . | . | . | . |
| . | . | . | . |

Fig. 3

CONTENTS TABLE

| TIME | CONTENTS NO. | CONTENTS | DISTRIBUTION -IN-PROGRESS FLAG |
|---|---|---|---|
| 12:00-1:00 | 100 | LIVE BROARDCASTING OF BASEBALL GAME | 0 |
| 1:00-3:00 | 101 | LIVE BROADCASTING OF GOLF MATCH | 1 |
| ... | ... | ... | ... |

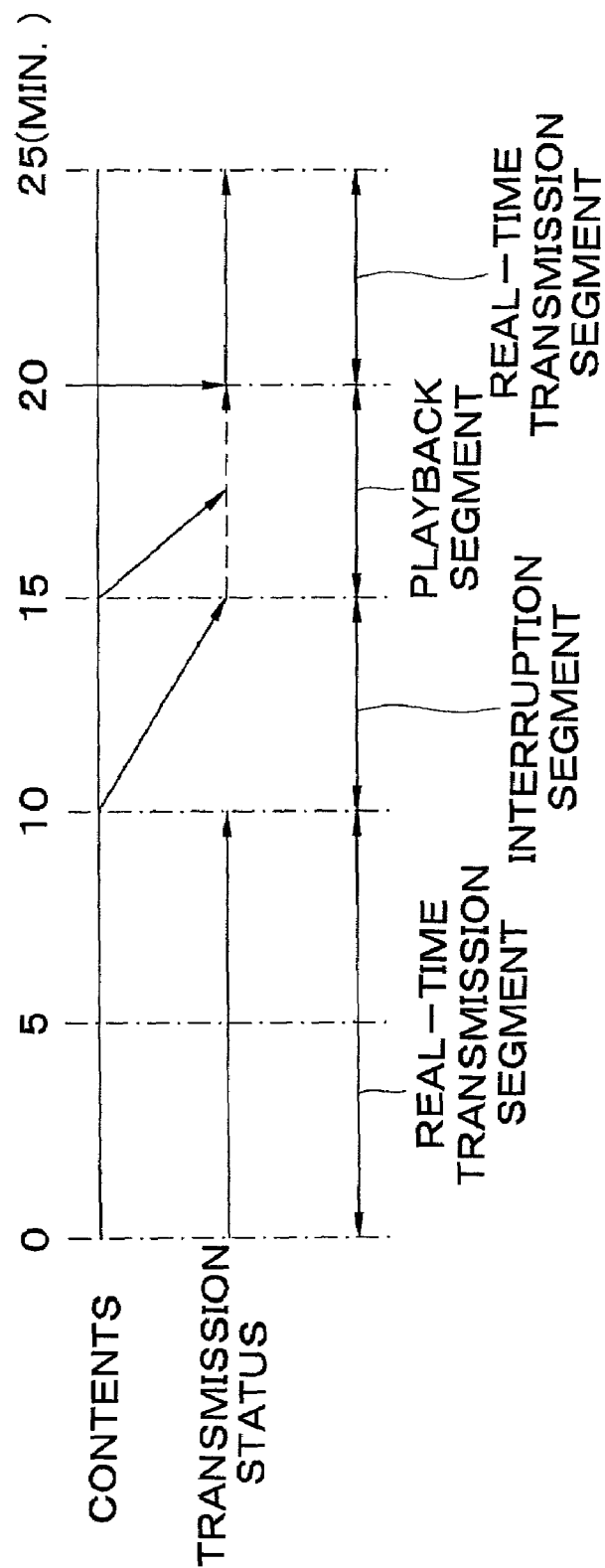

INFORMATION DISTRIBUTION APPARATUS THAT RESUMES DISTRIBUTION AFTER INTERRUPTION

BACKGROUND OF THE INVENTION

1. Field of the Invention

The present invention relates to a transmission apparatus which transmits multimedia information in real time.

2. Description of the Related Art

A system which distributes multimedia information, such as motion pictures and sound, in real time yields an advantage of a receiver being able to enjoy, as live information, events which occur in a physically remote location; e.g., news videos.

Japanese Patent Application Laid-Open Nos. 219970/1995 and 273246/1999 describe apparatus which display multimedia information. Japanese Patent Application Laid-Open No. 219970/1995 describes a technique for recording multimedia presentation in real time and playing back the portions a user has missed in an accelerated manner until the presentation catches up to the present time.

Japanese Patent Application Laid-Open No. 273246/1999 describes an information recording/playback apparatus which records and plays back information on and from a single recording medium. Recording and playback of information are performed simultaneously. Further, an arbitrary playback speed is set for playing back the recorded information, thereby causing a playback to catch up with a recording time.

However, when multimedia information is received by radio in real time by means of a mobile terminal, if for any reason communication is interrupted during real-time delivery of live information, the thus-interrupted live information cannot be recovered even after connection has been re-established.

Even in relation to the transmission apparatus described in Japanese Patent Application Laid-Open Nos. 219970/1995 and 273246/1999, no work around to recovery of interrupted real-time delivery is established.

SUMMARY OF THE INVENTION

Accordingly, the present invention is aimed at providing a multimedia information transmission apparatus capable of distributing multimedia information without fail even if interruption has arisen in real-time distribution of multimedia information.

To achieve the object, the present invention provides an information distribution apparatus for transmitting distribution information as real-time information, comprising:

distribution means for transmitting the distribution information in real time to a receiving end;

distribution information storage means for separately storing the distribution information to be transmitted by the distribution means;

interruption information storage means which, in the event that transmission of distribution information from the distribution means to a certain receiving terminal is interrupted, stores specific information for specifying a position on the distribution information where interruption has arisen; and re-distribution means which, in response to a request from the receiving terminal, loads from the distribution information storage means partial information which constitutes a portion of the distribution information stored in the distribution information storage means and is subsequent to a position specified by specific information that is stored in the interruption information storage means, and then transmits the partial information.

In the information distribution apparatus according to the present invention, distribution means transmits distribution information in real time. Distribution information to be transmitted by the distribution means is separately stored to its end. In the event that transmission with a receiving terminal has been interrupted for any reason, the interruption information storage means stores specific information for specifying an interrupted location on the distribution information; e.g., a time stamp. When a re-distribution request is issued by the receiving terminal later, the re-distribution means loads, from the distribution information storage means, partial information which constitutes a portion of the distribution information stored in the distribution information storage means and is subsequent to a position specified by specific information that is stored in the interruption information storage means in connection with the distribution information stored in the distribution information storage means. Then, the re-distribution means transmits the partial information to the receiving terminal which have issued the re-distribution request. Accordingly, even if communication has been interrupted, the receiving terminal can acquire contents which have been transmitted during a period of interruption. In short, a user can view distribution information which is distributed in real time, without fail.

Preferably, the re-distribution means transmits the partial information at a speed faster than that at which the distribution means transmits distribution information in real time. More specifically, the partial information is loaded from the distribution information storage means at a speed faster than that at which distribution information is to be transmitted in real time. Further, the partial information is distributed at high speed, by means of increasing a transfer rate over that employed in the case of real-time distribution. In this case, since distribution information, including a part of information corresponding to a period of interruption, is transmitted at high speed, the re-distribution means can catch up real-time distribution of information. After the re-distribution means has caught up with real-time distribution of information, operation can be switched to real-time distribution.

Preferably, the information distribution apparatus further includes:

time information sensing means for sensing time information pertaining to when the distribution information is distributed in real time; and changeover means which stops re-distribution operation performed by the re-distribution means and switches the re-distribution operation to real-time distribution by means of the distribution means when, as a result of re-transmission of distribution information performed by the re-distribution means, time information pertaining to the distribution information that has already been distributed by means of the re-distribution means has caught up with time information pertaining to real-time distribution sensed by the sensing means. As a result, when playback operation performed by the receiving-end has caught up with real-time distribution, the playback is switched to real-time distribution. Hence, from then on the user can view contents which are distributed in real time.

Preferably, the information distribution apparatus further includes update means for updating specific information stored in the interruption information storage means to time information about the distribution information that has already been distributed by the re-distribution means. As a result, the specific information stored in the interruption information storage means is compared with time information pertaining to real-time distribution, thereby determining whether or not operation has caught up with real-time distribution.

Preferably, the re-distribution means transmits an undistributed portion of the distribution information stemming from interruption such that transmission of the distribution information is completed when real-time transmission of the distribution information performed by the distribution means ends. As a result, when real-time distribution of contents ends, the user can finish viewing the contents. A burden imposed on the user who views the contents at the receiving end can be minimized as compared with a case where operation has caught up with real-time distribution of contents before real-time distribution of contents ends.

The present invention also provides an information distribution apparatus for transmitting distribution information as real-time information, comprising:

input means for entering the distribution information;

distribution means for transmitting to a receiving terminal in real time the distribution information that has been entered by way of the input means;

distribution information storage means for separately storing the distribution information that has been entered by way of the input means;

interruption information storage means which, in the event that transmission of distribution information from the distribution means to a certain receiving terminal is interrupted, stores specific information for specifying a position on the distribution information where interruption has arisen; and re-distribution means which, in response to a request from the receiving terminal, loads from the distribution information storage means partial information which constitutes a portion of the distribution information stored in the distribution information storage means and is subsequent to a position specified by specific information that is stored in the interruption information storage means, and then transmits the partial information.

In the information distribution apparatus according to the present invention, distribution information serving as real-time information is input by way of the input means. The distribution means transmits the thus-input distribution information in real time. Further, the thus-input distribution information is stored separately. In the event that transmission with a receiving terminal has been interrupted for any reason, the interruption information storage means stores specific information for specifying an interrupted location on the distribution information; e.g., a time stamp. When a re-distribution request is issued by the receiving terminal later, the re-distribution means loads, from the distribution information storage means, partial information which constitutes a portion of the distribution information stored in the distribution information storage means and is subsequent to a position specified by specific information that is stored in the interruption information storage means in connection with the distribution information stored in the distribution information storage means. Then, the re-distribution means transmits the partial information to the receiving terminal which have issued the re-distribution request. Accordingly, even if communication has been interrupted, the receiving terminal enables the user to view contents which have been transmitted during a period of interruption. In short, the user can view distribution information which is distributed in real time, without fail.

Preferably, the re-distribution means transmits distribution information at a speed faster than that at which the distribution means distributes distribution information in real time.

Preferably, the information distribution apparatus further includes:

time information sensing means for sensing time information pertaining to when the distribution information is distributed in real time; and changeover means which stops re-distribution operation performed by the re-distribution means and switches playback operation to real-time distribution of contents by means of the distribution means when, as a result of re-transmission of distribution information performed by the re-distribution means, time information pertaining to the distribution information that has already been distributed by means of the re-distribution means has caught up with time information pertaining to real-time distribution sensed by the sensing means.

The present invention also provides an information distribution apparatus for transmitting distribution information as real-time information, comprising:

input means for entering the distribution information;

distribution means for transmitting the distribution information to a receiving end;

distribution information storage means for separately storing the distribution information that has been entered by way of the input means;

interruption information storage means which, in the event that transmission of distribution information from the distribution means to a certain receiving terminal is interrupted, stores specific information for specifying a position on the distribution information where interruption has arisen; and a controller which stores into the distribution information storage means the distribution information that has been input by way of the input means and controls the distribution means so as to transmit the distribution information in real time when transmission of the distribution information to the receiving terminal is not interrupted; and which stores the specific information into the interruption information storage means when transmission of distribution information to a certain receiving terminal is interrupted, which loads, when a request is issued by the receiving terminal, partial information from the distribution information storage means, the partial information constituting a portion of the distribution information stored in the distribution information storage means and being subsequent to a position specified by specific information stored in the interruption information storage means, and which controls the distribution device so as to distribute the partial information.

In the information distribution apparatus according to the present invention, distribution information serving as real-time information is input by way of the input means. The thus-input distribution information is stored separately in the distribution information storage means. The distribution means distributes the distribution information to the receiving end. When transmission of the-distribution information to the receiving terminal has not been interrupted, the controller controls the distribution means so as to transmit the distribution information in real time. In contrast, in the event that transmission of the distribution information to a certain receiving terminal has been interrupted, the controller stores the specific information into the interruption information storage means. When a request is issued by the receiving terminal for which transmission has been disconnected, the controller loads partial information from the distribution information storage means, the partial information constituting a portion of the distribution information stored in the distribution information storage means and being subsequent to a position specified by specific information stored in the interruption information storage means, and which controls the distribution device so as to distribute the partial information to the receiving terminal which have issued the re-distribution request. Accordingly, even if communication has been interrupted, the receiving terminal enables the user to view contents which have been transmitted during a period of interruption. In short, the user can view distribution information which is distributed in real time, without fail.

Preferably, the controller loads partial information from the interruption information storage means at a speed faster than that at which distribution information is to be transmitted in real time. In this case, distribution information, including partial contents corresponding to a period of interruption, is loaded at high speed. Hence, operation can catch up with real-time transmission of the distribution information. After the operation has caught up with real-time distribution of the distribution information, operation can be switched to real-time distribution.

Preferably, the controller controls the distribution means such that distribution information is transmitted at a speed faster than that at which the distribution information is to be transmitted in real time.

In this case, distribution information, including partial contents corresponding to a period of interruption, is transmitted at high speed. Hence, operation can catch up with real-time transmission of the distribution information. After the operation has caught up with real-time distribution of the distribution information, operation can be switched to real-time distribution.

Preferably, when time information about the distribution information that has already been transmitted by the distribution means has caught up with time information about the distribution information which is transmitted in real time, as distribution of the partial information, the controller stops distribution of the partial information and switches playback of the distribution information to real-time distribution of the distribution information. When the playback operation performed by the receiving end has caught up with real-time distribution, operation is switched to real-time distribution. Hence, from then on, the user can view contents which are distributed in real time.

Preferably, when a portion of the partial information has been transmitted, the controller updates specific information stored in the interruption information storage means to time information pertaining to the end position of the partial information. Hence, the specific information stored in the interruption information storage means is compared with time information pertaining to real-time distribution, thereby enabling a determination as to whether or not operation has caught up with real-time distribution.

Preferably, the controller loads partial information from the distribution information storage means such that distribution of an undistributed portion of the transmission-interrupted distribution information ends when real-time transmission of the distribution information performed by the distribution means is completed. As a result, the user can finish viewing contents when real-time distribution of the contents is completed. A burden imposed on the user who views the contents at the receiving end can be minimized as compared with a case where operation has caught up with real-time distribution of contents before real-time distribution of contents ends.

Preferably, the controller controls the distribution means, such that distribution of an undistributed portion of the transmission-interrupted distribution information ends when real-time transmission of the distribution information performed by the distribution means is completed. As a result, the user can finish viewing contents when real-time distribution of the contents is completed. A burden imposed on the user who views the contents at the receiving end can be minimized as compared with a case where operation has caught up with real-time distribution of contents before real-time distribution of contents ends.

The present invention also provides an information distribution apparatus for transmitting distribution information as real-time information, comprising:

distribution means for transmitting the distribution information to a receiving end;

a distribution information storage means for separately storing the distribution information that has been entered by way of the distribution means;

interruption information storage means which, in the event that transmission of distribution information from the distribution means to a certain receiving terminal is interrupted, stores specific information for specifying a position on the distribution information where interruption has arisen; and a controller which stores into the distribution information storage means the distribution information that has been input by way of the input means and controls the distribution means so as to transmit the distribution information in real time when transmission of the distribution information to the receiving terminal is not interrupted; and which stores the specific information into the interruption information storage means when transmission of distribution information to a certain receiving terminal is interrupted, which loads, when a request is issued by the receiving terminal, partial information from the distribution information storage means, the partial information constituting a portion of the distribution information stored in the distribution information storage means and being subsequent to a position specified by specific information stored in the interruption information storage means, and which controls the distribution device so as to distribute the partial information.

In the information distribution apparatus according to the present invention, distribution information to be distributed as real-time information by the distribution means is stored separately in the distribution information storage means. Further, the distribution means distributes the distribution information to the receiving end. When transmission of the distribution information to the receiving terminal has not been interrupted, the controller controls the distribution means so as to transmit the distribution information in real time. In contrast, in the event that transmission of the distribution information to a certain receiving terminal has been interrupted, the controller stores the specific information into the interruption information storage means. When a request is issued by the receiving terminal for which transmission has been disconnected, the controller loads partial information from the distribution information storage means, the partial information constituting a portion of the distribution information stored in the distribution information storage means and being subsequent to a position specified by specific information stored in the interruption information storage means, and which controls the distribution device so as to distribute the partial information to the receiving terminal which have issued the re-distribution request. Accordingly, even if communication has been interrupted, the receiving terminal enables the user to view contents which have been transmitted during a period of interruption. In short, the user can view distribution information which is distributed in real time, without fail.

Preferably, the controller loads partial information from the distribution information storage means at a speed faster than that at which the distribution information is to be transmitted in real time.

Preferably, the controller controls the distribution means such that partial information is transmitted at a speed faster than that at which the distribution information is to be transmitted in real time.

BRIEF DESCRIPTION OF THE DRAWINGS

FIG. 2 is a descriptive view showing the configuration of an interruption information table;

FIG. 3 is a descriptive view showing the configuration of a content table;

FIG. 8 is a chart showing the operation of the distribution information transmitter according to the embodiment of the present invention.

DESCRIPTION OF THE PREFERRED EMBODIMENTS

Figure 1:
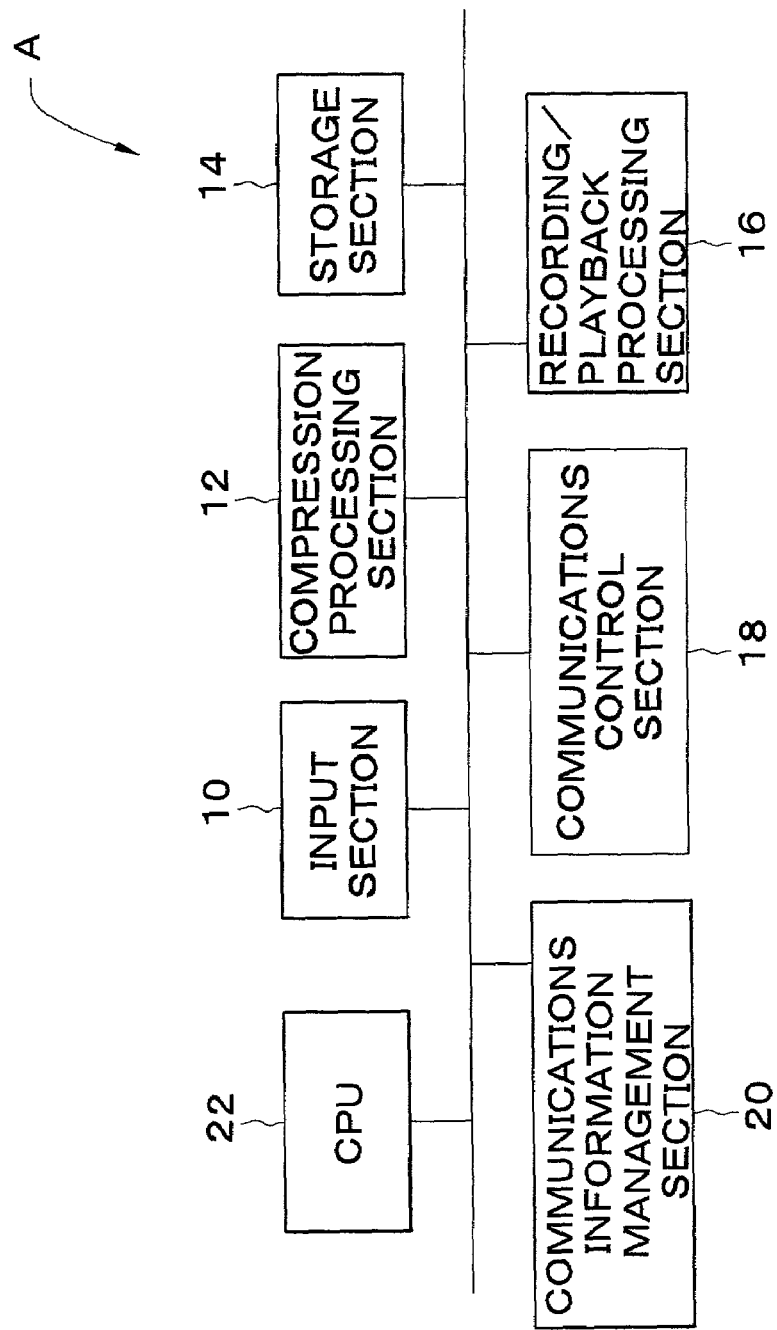
FIG. 1 is a block diagram showing a distribution information transmitter according to an embodiment of the present invention.

A preferred embodiment of the present invention will be described hereinbelow by reference to the accompanying drawings. As shown in FIG. 1, a distribution information transmitter (information delivery apparatus) A comprises an input section 10, a compression processing section 12, a storage section 14, a recording/playback processing section 16, a communication control section 18, a communications information management section 20, and a CPU 22.

The input section 10 is used for entering image information or sound information, primarily multimedia information. The input section 10 corresponds to a video camera or the like. Information entered by way of the input section 10; primarily, multimedia information, corresponds to distribution information; i.e., information to be distributed. In short, the distribution information corresponds to real time information. The input section 10 acts as input means and an input device.

The compression processing section 12 compresses the distribution information entered by way of the input section 10, by means of a known compression technique.

The storage section 14 is a storage device for storing distribution information. More specifically, the distribution information compressed by the compression processing section 12 is recorded in the storage section 14. The storage section 14 acts as a distribution information storage device.

The recording/playback processing section 16 manages recording of distribution information into the storage section 14 or reading of distribution information from the storage section 14. Further, the recording/playback processing section 16 has the function of controlling a rate at which information is to be loaded from the storage section 14 (i.e., a loading rate). At the time of controlling the rate for loading information from the storage section 14, the recording/playback processing section 16 acts as a controller.

The communication control section 18 has the function of governing radio communication with a communications device disposed at the receiving end; that is, a mobile terminal, and delivering distribution information. The communication control section 18 acts as a delivery device.

The communications information management section 20 is for managing various information items to be used for delivering distribution information. More specifically, the communications management section 20 has an interruption information table, such as that shown in FIG. 2 and a content table such as that shown in FIG. 3.

In the event that distribution of information is interrupted for reasons of occurrence of a failure in a transmission line between the distribution information transmitter A and a mobile terminal disposed at the receiving end, predetermined information is to be written into the interruption information table. More specifically, information, such as a client ID, a contents number, a time stamp, and a distribution end flag, is written into the interruption information table. The client ID is assigned to a mobile terminal whose information distribution has been interrupted. A contents number is information for specifying distribution information (or may be contents) whose transmission has been interrupted. For example, information for specifying certain contents (e.g., a program) is stored as the contents number. A time stamp is information representing a time duration over which distribution has been interrupted. For example, information about a time which has lapsed from a start time until interruption arises is recorded as a time stamp. Alternatively, information about a time at which distribution has been interrupted may be recorded as a time stamp. In the case of packet transmission, there may be recorded information for specifying a packet whose transmission has been interrupted. A distribution end flag indicates whether or not distribution has been completed. When real-time distribution is in progress (i.e., when distribution has not yet been completed), the distribution end flag is set to OFF. In contrast, when distribution has been completed, the distribution end flag is set to ON. The CPU 22 manages the distribution end flag. When distribution of contents has been completed, the CPU 22 performs control operation so as to switch the distribution end flag to ON.

The information stored in the interruption information table constitutes distribution interruption information. The interruption information table acts as an interruption information storage device. The time stamp acts as "specific information for specifying an interrupted position on distribution information." A client ID stored in the interruption information table corresponds to the foregoing receiver information. Further, a contents number stored in the interruption information table corresponds to distribution information specific information.

As shown in FIG. 3, the content table stores a time required for delivering distribution information, a contents number, and a delivery-in-progress flag showing whether or not real-time delivery is in progress. For example, when the present time is 1:10, contents assigned contents number 101 are in the course of being distributed in real time according to the contents shown in FIG. 3. Hence, the delivery-in-progress flag assumes 1. In contrast, when contents are not in the course of being distributed in real time, the delivery-in-progress flag does not assume 0. The expression "real-time delivery of contents is in progress" means that the contents are in a state in which the contents can be distributed in real time if a delivery request is output from a receiver terminal.

For instance, a user of the distribution information transmitter A, such as a manager, stores a part of data into the content table by means of setting a part of the data. For instance, a user registers information in connection with a "time," a "contents number," and "contents." In relation to the "delivery-in-progress flag," information stored in "time" of the content table is compared with a time, and the delivery-in-progress flag is automatically switched. For example, in connection with an example content table shown in FIG. 3, a delivery-in-progress flag of contents assigned contents number "100" is switched from 0 to 1 when the time has become 12:00. Further, when the time has become 1:00, the deliver-in-progress flag is switched from 1 to 0. When the time has become 1:00, a delivery-in-progress flag of the contents assigned contents number 101 is switched from 0 to 1. When the time has become 3:00, the delivery-in-progress flag is switched from 1 to 0.

The delivery end flag stored in the interruption information table corresponds to the deliver-in-progress flag. If certain contents are in the course of being distributed in real time, the delivery end flag remains OFF, and the delivery-in-progress flag becomes 1. In contrast, if contents are not in the course of being distributed in real time, the delivery end flag remains ON, and the delivery-in-progress flag becomes 0. When the delivery end flag stored in the interruption information table is managed, the delivery end flag may be managed while the delivery-in-progress flag in the contents table is being monitored. In other words, when a delivery-in-progress flag assigned to certain contents has switched from 1 to 0, a delivery end flag in the interruption information table corresponding to the contents is turned ON.

In relation to the delivery-in-progress flag, the flag assumes 1 when contents are in the course of being distributed in real time and assumes 0 when contents are not in the course of being distributed in real time. Alternatively, the flag may be set to ON when contents are in the course of being distributed in real time and may be set to OFF when contents are not in the course of being distributed in real time. Conversely, the flag may assume 1 when contents are in the course of being distributed in real time and may assume 0 when contents are not in the course of being distributed in real time. In relation to the delivery end flag, the flag may assume 0 when contents are in the course of being distributed in real time and delivery of the contents has not yet been completed. Further, the flag may assume 1 when delivery of the contents has completed.

The communications information management section 20 is provided with a real-time delivery counter serving as a counter for counting time information about real-time delivery of contents. For instance, in relation to the example shown in FIG. 3, if the program has passed 10 minutes in connection with contents assigned contents number 101, a counter assumes a value of 10 min. The real-time delivery counter acts as "time information detection means for detecting time information about real-time delivery."

The CPU 22 is for controlling operations of individual sections of the distribution information transmitter A. Particularly, the individual sections are operated in the manner as described in the flowcharts shown in FIGS. 5, 6 and 7. A program to be used for activating the distribution information transmitter A in the manner as mentioned below can be said to be stored in the CPU 22 or the storage section 14. That program may be stored in the CPU 22 and the storage section 14 or the like. The communications control section 18 and the CPU 22 act as the delivery means and the re-delivery means.

Figure 4:
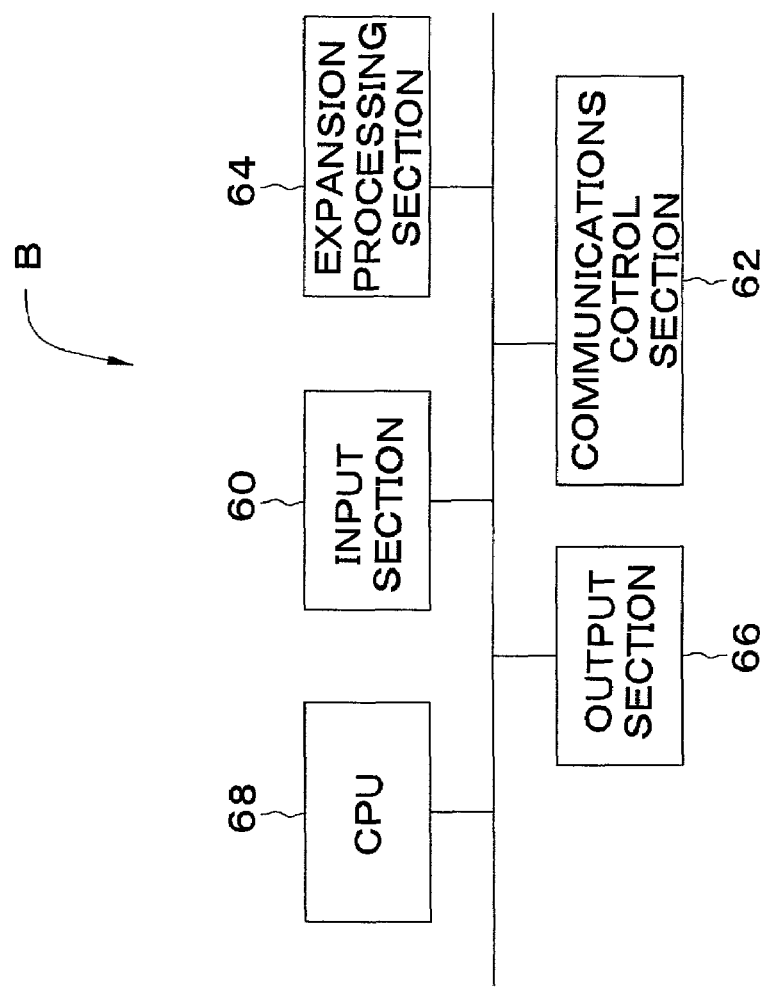
FIG. 4 is a block diagram showing the configuration of a distribution information receiver according to the embodiment of the present invention.

There will now be described a distribution information receiver B for receiving the information distributed from the distribution information transmitter A. As shown in FIG. 4, the distribution information receiver B comprises an input section 60, a communications control section 62, an expansion processing section 64, an output section 66, and a CPU 68.

The input section 60 is for activating the distribution information receiver B. For instance, the input section 60 corresponds to an input key. The communications control section 62 has the function of governing radio communication and establishes communication with a communicator disposed at the sending site; more specifically, the distribution information transmitter A. The expansion processing section 64 expands the distribution information received by way of the communications control section 62. The output section 66 outputs the distribution information expanded by the expansion processing section 64. More specifically, the output section 66 is constituted of a display device for displaying an image, or a sound output device for outputting sound. The CPU 68 is for controlling individual sections of the distribution information receiver B. Particularly, the distribution information receiver B has the function of establishing communication with the distribution information transmitter A. Hence, the distribution information transmitter A and the distribution information receiver B can exchange data. Particularly, the distribution information transmitter A sends distribution information to the distribution information receiver B.

The distribution information transmitter A and the distribution information receiver B constitute a distribution information transceiver system.

The operation of the distribution information transceiver system having the foregoing construction will now be described. Unless otherwise particularly described, processing performed by the distribution information transmitter A, such as determination processing, is performed by the CPU 22.

Figure 5:
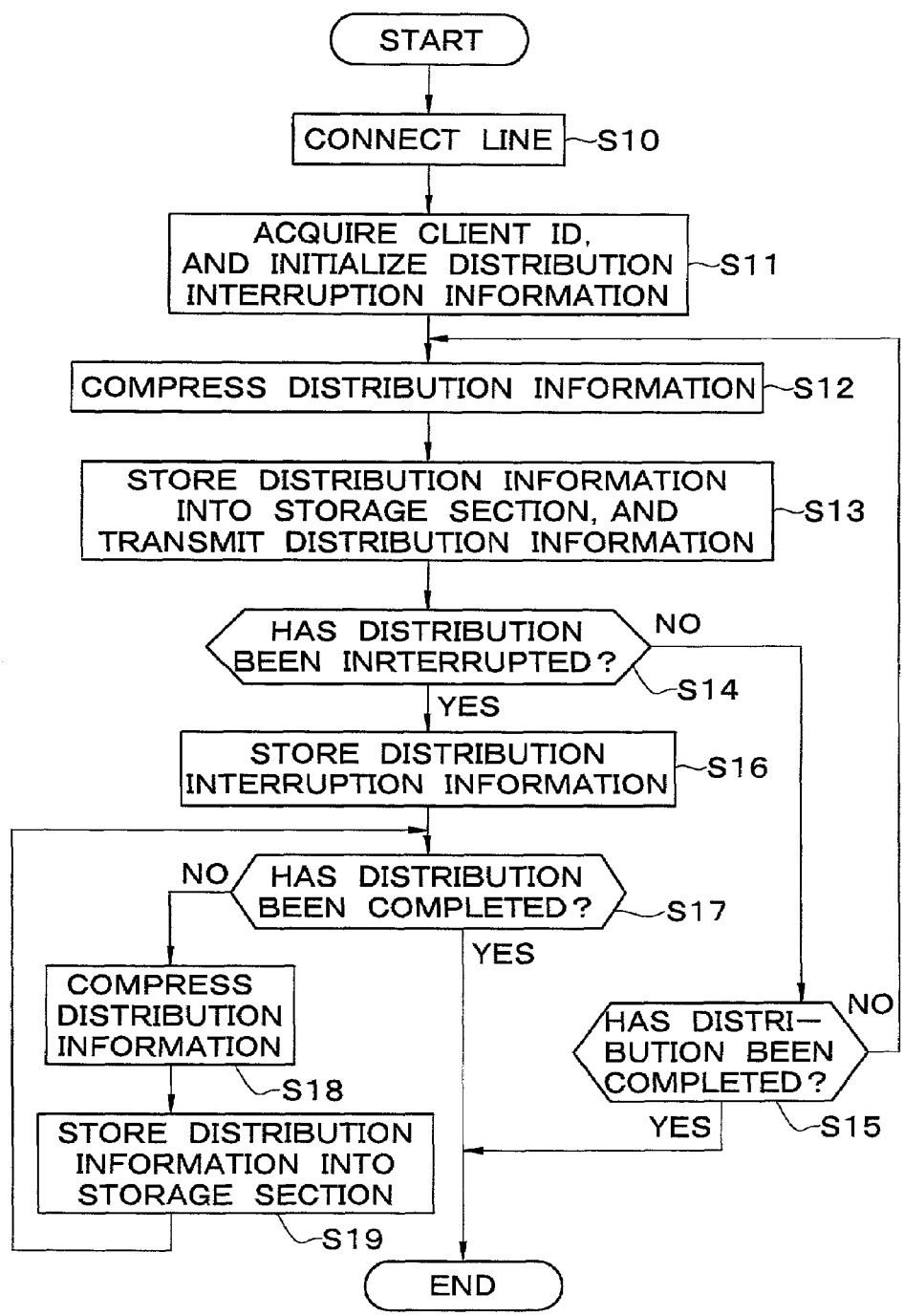
FIG. 5 is a flowchart showing the operation of the distribution information transmitter according to the embodiment of the present invention.

The operation of the distribution information transceiver system performed at the start of delivery operation will now be described by reference to FIG. 5. The following description assumes that a line has been established between the distribution information transmitter A and the distribution information receiver B (S10); that is, a call has been originated from the distribution information receiver B to the distribution information transmitter A, thereby requesting distribution of predetermined distribution information. Data pertaining to a client ID are transmitted from the distribution information receiver B to the distribution information transmitter A.

The distribution information transmitter A acquires the client ID from the distribution information receiver B (S11) The client ID is an ID unique to the individual distribution information receiver B or to the operator thereof. The client ID is received and acquired by way of the communications control section 18. The thus-acquired client ID is temporarily stored in the CPU 22. The client ID may be transmitted from a terminal located at the center (also called a "center terminal") which establishes communication between the distribution information transmitter A and the distribution information receivers B. More specifically, when the center terminal is provided for establishing communication between the distribution information transmitter A and the distribution information receivers B, in response to operation thereof, the distribution information receiver B sends to the center terminal data stating that there has been performed an operation for requesting distribution of predetermined distribution information. Upon receipt of the data, the center terminal sends a client ID to the distribution information transmitter A.

Simultaneously, predetermined distribution interruption information stored in the interruption information table is initialized (S11). In a case where information about a contents number and a time stamp has already been recorded in connection with the client ID, information about a client ID, a contents number, and a time stamp is cleared.

The compression processing section 12 compresses distribution information (S12). The thus-compressed distribution information is distributed to the distribution information receiver B by way of the communications control section 18, and the distribution information is recorded in the storage section 14 (S13). In principle, the distribution information is entered as real-time information by way of the input section 60. The distribution information that has been entered by way of the input section 60 is compressed in step S12. In step S13, distribution information is distributed as real-time information. Hence, the distribution operation performed in step S13 can be said to be real-time distribution operation. In this case, the communications control section 18 which distributes distribution information acts as distribution means.

The communications control section 18 senses whether or not distribution remains in an interrupted state (S14). It can be checked whether or not distribution has been interrupted, from absence or presence of a signal output from the distribution information receiver B. The CPU 22 makes a determination as to whether or not distribution has been interrupted. In this case, the CPU 22 acts as interruption detection means. When no interruption has been detected, processing pertaining to steps S12 and S13 is continuously performed until distribution is completed (S15). In contrast, in the event that distribution has been interrupted, distribution interruption information is stored (S16). More specifically, the client ID acquired in step S11 is written into the interruption information table, and contents number information and time stamp information about the contents for which distribution has been interrupted are written into the interruption information table. In other words, in relation to a time stamp, information representing the time at which distribution has been interrupted is written into the interruption information table. The CPU 22 performs writing of information into the interruption information table. In this case, the interruption information table or the CPU 22 acts as interruption information means. As in the case of step S12, the compression processing section 12 compresses distribution information (S18) until distribution of information is completed (S17). The thus-compressed distribution information is stored in the storage section 14 (S19). More specifically, even when distribution has been interrupted, the entirety of distribution information; i.e., information about the entirety of certain contents, is stored in the storage section 14. The CPU 22 controls storage of contents information into the storage section 14. In this case, the storage section 14, the CPU 22, and the compression processing section 12 act as distribution information storage means.

Under circumstances where a plurality of distribution information receivers B receive information distributed from the distribution information transmitter A, even if communication with a certain distribution information receiver B has been interrupted, real-time distribution of contents to the remaining distribution information receivers B is continued.

Figure 6:
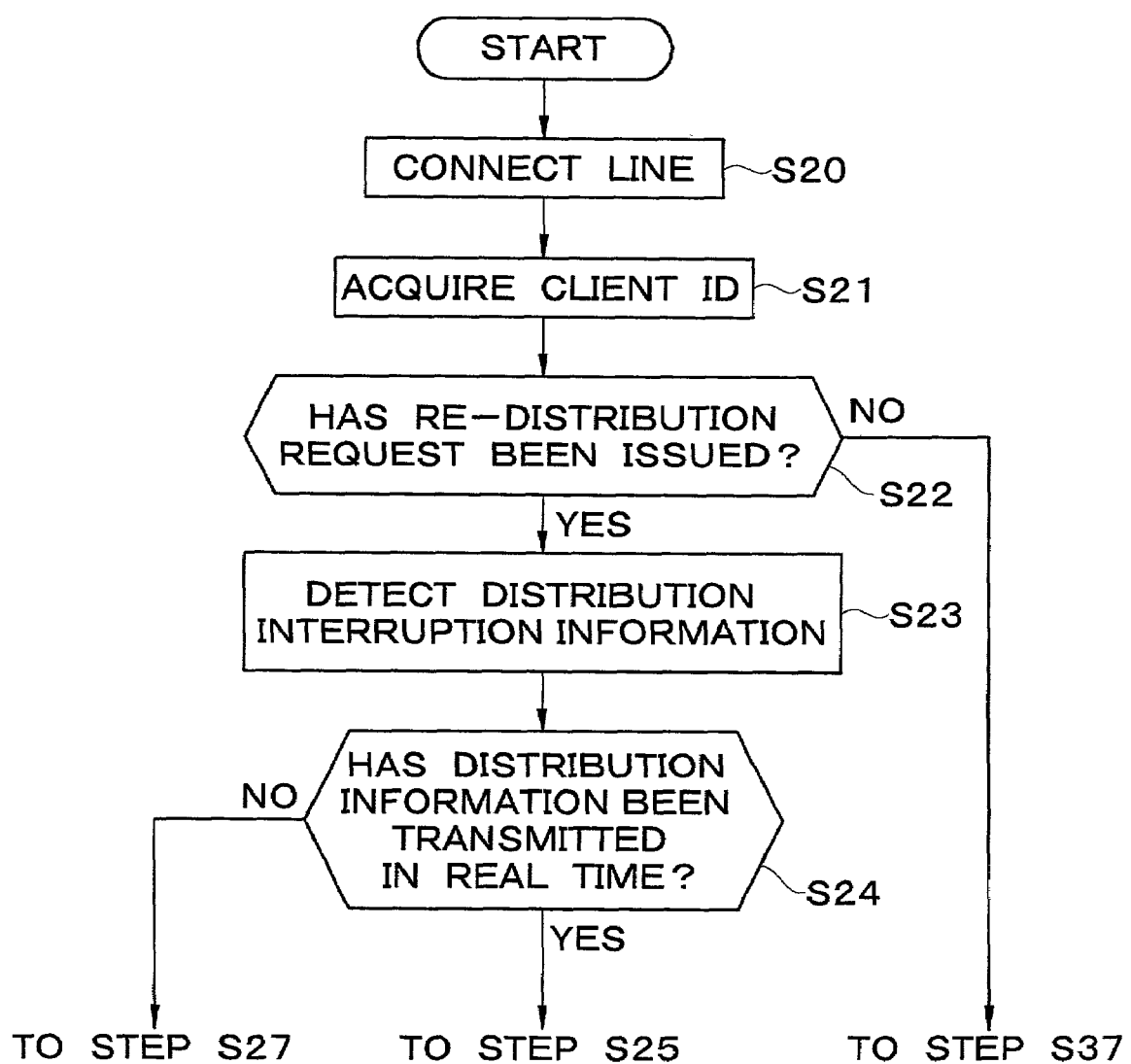
FIG. 6 is a flowchart showing the operation of the distribution information transmitter according to the embodiment of the present invention.
Figure 7:
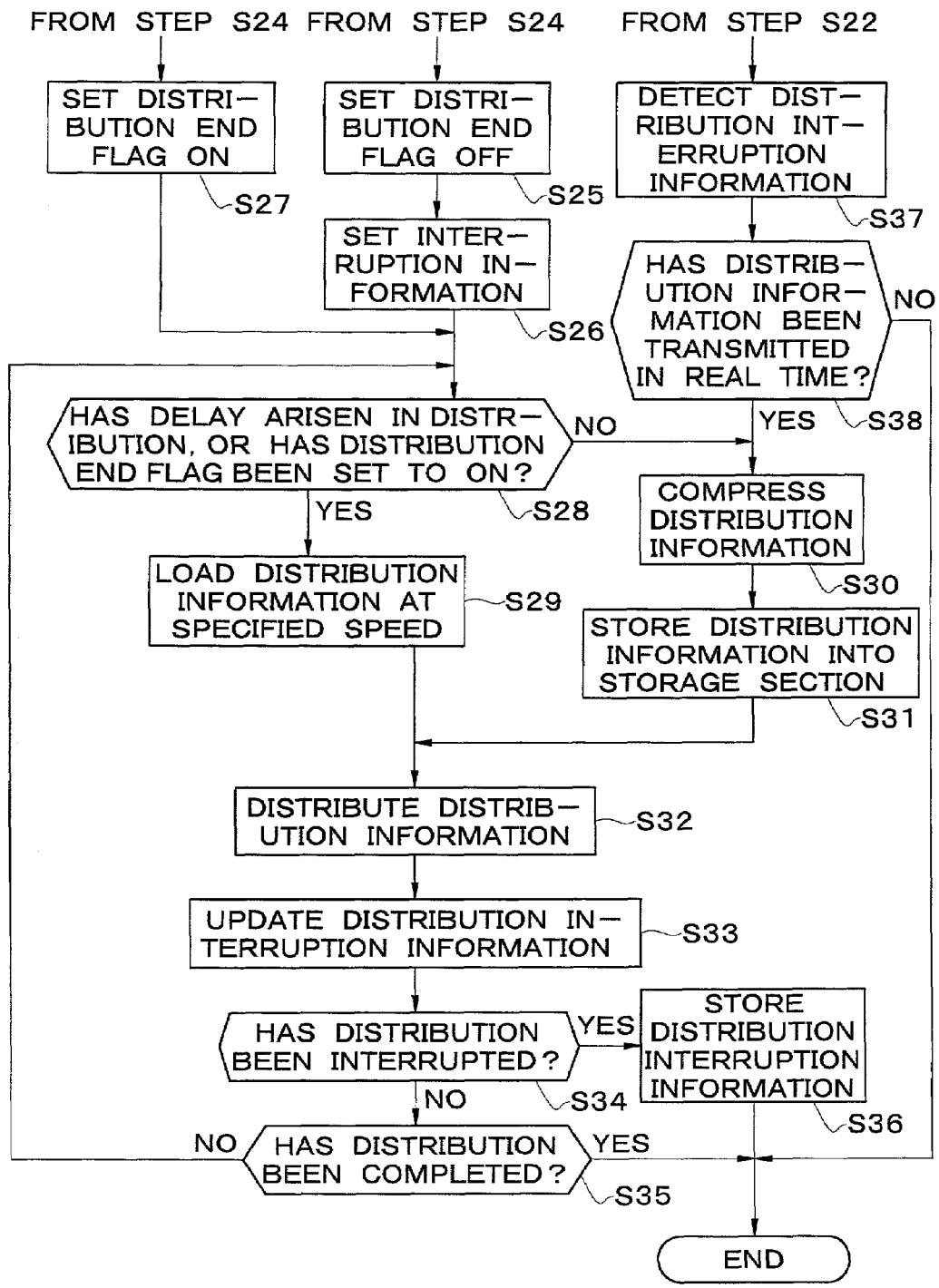
FIG. 7 is a flowchart showing the operation of the distribution information transmitter according to the embodiment of the present invention.

The operation of the distribution information transceiver system performed at the time of re-distribution of contents will now be described by reference to FIGS. 6 and 7. The re-distribution operation is performed at least subsequent to the operation pertaining to step S16 shown in FIG. 5. Assume that, when distribution has been interrupted in the course of the distribution process, a line between the distribution information receiver B and the distribution information transmitter A has been re-established (S20). When in step S20 the line has been re-established, the contents for which distribution has been interrupted may have been distributed in real time, or real-time distribution of the contents may have been completed. In such a case, the distribution information transmitter A acquires a client ID from the distribution information receiver B (S21).

Selection is made as to whether the distribution information receiver B is to send a re-distribution request or a real-time distribution request. More specifically, through use of the distribution information receiver B, the user of the distribution information receiver B performs an operation for selecting either a re-distribution request or a real-time distribution request. Here, the re-distribution request is a request for transmission of distribution information including contents that had been distributed during an interruption period. The real-time distribution request is a request for transmission of distribution information which is currently being distributed in real time, while contents that had been distributed during a period of interruption are omitted. Upon performance of an operation for selecting either a re-distribution request and a real-time distribution request, transmission data corresponding to the operation are transmitted to the distribution information transmitter A.

The distribution information transmitter A determines whether or not the re-distribution request has been issued (S22) In short, on the basis of the transmission data sent from the distribution information receiver B, the CPU 22 makes a determination as to whether or not the re-distribution request has been issued.

If the result of determination shows that the re-distribution request has been issued, distribution interruption information is detected (S23). More specifically, by means of retrieval of the interruption information table stored in the communications information management section 20, the CPU 22 retrieves distribution interruption information about the client ID acquired in step S21.

A determination is made as to whether or not contents assigned to the contents numbers relating to the detected distribution interruption information are in the course of real-time distribution (S24). Here, the CPU 22 makes a determination. A determination as to whether or not contents are in the course of real-time distribution can be made in accordance with a result of a determination as to whether or not the distribution-in-progress flag stored in the contents table assumes 1. In other words, when the distribution-in progress flag assumes 1, it is determined that contents are in the course of real-time distribution.

When contents are in the course of real-time distribution, the distribution end flag stored in the interruption information table is set to OFF (S25), and the distribution interruption information is set (S26). In short, the CPU 22 sets the distribution end flag to OFF. Further, distribution interruption information about the client ID is read from the interruption information table, and the thus-read information is retained. In contrast, if contents are not in the course of real-time distribution, the distribution end flag is set to ON (S27).

There are made a determination as to whether or not delays have arisen in distribution information and a determination as to whether or not the distribution end flag is ON (S28). These determinations are also made by the CPU 22. Here, occurrence of delays in distribution information means a case where the transmitted distribution information lags behind the information transmitted in real time. More specifically, a time stamp assigned to the distribution interruption information is compared with time information pertaining to a real-time distribution counter. If the time stamp assigned to the distribution interruption information is delayed behind the information distributed in real time, a lag has arisen between the transmitted distribution information and the distribution information transmitted in real time.

When processing has shifted from step S26 to step S28, a comparison is made between the time stamp assigned to the distribution interruption information and the time of the real-time distribution. For example, certain contents were distributed for 10 minutes and were interrupted later. When distribution of the contents is resumed 5 minutes later, real-time distribution has been effected for a total of 15 minutes. In this case, the time stamp assigned to the distribution interruption information is 10 minutes, and the time information about real-time distribution is 15 minutes. Hence, it is seen that a lag has arisen between the distribution information items.

When time information is stored in a time stamp, the time information is compared with the time of real-time distribution. For instance, certain contents had been distributed by 12:10 but interrupted there after. When are-distribution request was issued, the time of real-time distribution was 12:15. Since a time stamp of the distribution interruption information is 12:10, and time information about real-time distribution is 12:15, it is understood that a lag has arisen in distribution information.

When processing has shifted from step S35 to S28, distribution interruption information is updated by means of transmission of distribution information (S33). The thus-updated time stamp of distribution interruption information is compared with real-time distribution. When contents have been distributed for 15 minutes and contents have also been distributed in real time for 17 minutes and 30 seconds, it is understood that a lag has arisen between transmitted information items. If in step S28 a lag has arisen in transmitted information items or a distribution end flag remains ON, processing proceeds to step S29. In contrast, if neither of these conditions is satisfied, processing proceeds to step S30.

In step S29, the recording/playback processing section 16 reads at a specified speed distribution information stored in the storage section 14 (S29). At the time of reading of distribution information, distribution information is read from a memory location(position) in the storage section 14 which indicated by a time stamp stored in the interruption information table. In other words, distribution information about certain contents are loaded not from the beginning but from an intermediate position in the information. More specifically, a portion of distribution information is loaded. In this case, the information to be loaded is taken as partial information. In other words, partial information which constitutes a portion of the distribution information and is subsequent to a position specified by specific information that is stored in the interruption information storage means device are loaded. In relation to a specified speed, distribution information is loaded faster than in the case of real-time distribution of information. In principle, during high-speed loading operation, decimation processing is performed. More specifically, distribution information is loaded from the storage section 14 faster than in the case of real-time distribution. The thus-loaded distribution is subjected to decimation processing. The recording/playback processing section 16 loads distribution information from the storage section 14 and performs decimation processing to be effected during the loading operation.

For instance, a predetermined volume of distribution information is input to the communications control section 18 per unit time during real-time distribution operation. When the distribution information is transmitted to the outside from the communications control section 18, distribution information greater in volume than the predetermined volume is loaded from the storage section 14 per unit time, and the thus-loaded information is subjected to decimation processing. For instance, provided that the volume of data distributed per unit time during real-time distribution is taken as U1 and that the volume of data loaded from the storage section 14 per unit time during re-distribution operation is taken as U2, the loaded distribution information is decimated to U1/U2 during decimation processing. When distribution information is loaded at a speed double that at which information is transmitted in real time, the information is decimated to ½. Provided that distribution information corresponding to a frame J (J is an integer) is input to the communications control section 18 for one second during real-time distribution operation and that the thus-input information is output to the outside from the communications control section 18, distribution information corresponding to two frames J are loaded from the storage section 14 per second. The thus-loaded information is decimated to data corresponding to a frame J. From another viewpoint, it may be said that a certain volume of distribution information is loaded within a period of time shorter than that during which the information is to be distributed in real time (this time is taken as a "real-time distribution time") and that the thus-loaded distribution information is subjected to decimation processing.

More specifically, when distribution information is transmitted at a speed double that at which information is transmitted in real time; that is, when distribution information is sent from the distribution information transmitter A at a speed double that at which distribution information is transmitted in real time, the recording/playback processing section 16 loads distribution information from the storage section 14 so that the information can be transmitted in the manner as mentioned previously. For example, data having a duration of 10 minutes are in principle loaded in 5 minutes and then transmitted. At this time, the distribution information loaded from the storage section 14 is subjected to decimation.

As mentioned above, the specified speed is set so that distribution information is output at a speed faster than at which the distribution information is output in real time, thereby catching up with the time of real-time distribution. As a result, contents that have been transmitted in real time for a time "n" can be transmitted in time "m" (m<n). Here, the distribution information transmitter A can arbitrary set "m" and "n." In short, a plurality of types of transmission rates can be set.

When distribution information is read and transmitted at a speed 1.1 to 1.2 times that at which distribution information is transmitted in real time, the distribution information receiver B can reduce a burden imposed on the user when the user views the distribution information.

When real-time distribution of contents to be transmitted has ended, transmission of distribution information at the specified speed may be ended. In short, when interruption has arisen, a remaining distribution time of the contents is taken as T1, and a time from when re-distribution of contents until real-time distribution of contents is ended is taken as T2. In this case, information having a duration equal to T1 must be transmitted in time T2. The specified speed is set to a speed which is T1/T2 times the speed of real-time distribution, and re-distribution of contents is performed. In this case, information about the time required for delivering overall contents (hereinafter called an "overall distribution time") is stored in the interruption information table. When a re-distribution request is issued by the distribution information receiver B, the CPU 22 computes a remaining distribution time T1 from a time stamp and information about an overall distribution time. Thus, there is computed a time T2 between when re-distribution of contents is performed and when real-time distribution of contents is completed. By means of computing T1/T2=k, there is calculated the ratio between the speed of real-time distribution and the speed of re-distribution. In step S29, after contents have been loaded at a speed "k" times that at which contents are distributed in real time, the distribution information is transmitted to the distribution information receiver B. In this case, processing does not return to real-time distribution.

When real-time distribution of contents is just completed, distribution of information at the specified speed is also completed simultaneously. As a result, the user can finish viewing the contents at the same time as that at which real-time distribution of the contents is completed. A burden imposed on the user who views contents by way of the distribution information receiver B can be reduced as compared with a case where the user catches up with real-time distribution before real-time distribution is completed.

The distribution information read at high speed is distributed to the distribution information receiver B by way of the communications control section 18 (S32). In other words, the recording/playback processing section 16 sends to the communications control section 18 the distribution information that has been decimated. The communications control section 18 then sends the distribution information to the distribution information receiver B which has issued the re-distribution request. At the time of distribution of information, information is distributed through use of the line connected in step S20. When contents are distributed at double speed, contents are distributed in one-half the usual period of time. Processing pertaining to steps S29 and S32 can be said to be performed in a high-speed transmission mode. In this way, distribution information can be sent at a speed faster than that at which distribution information is distributed in real time. Consequently, in a high-speed transmission mode, the distribution information receiver B outputs contents at high speed. The recording/playback processing section 16 which loads transmitted information in step S29 and the communications control section 18 which distributes information in step S32 or the like act as re-distribution means.

The distribution interruption information is updated after transmission of distribution information (S33). The time stamp stored in the interruption information table is replaced with the time stamp obtained at a point in time when distribution is completed. Here, updating of distribution interruption information is performed every time a predetermined volume of distribution information has been transmitted. Alternatively, updating of the distribution interruption information may be effected each time information for a given time interval has been distributed (e.g., every 1 or 5 minutes). For example, if distribution of contents for 15 minutes has already been completed, the time stamp information is rewritten to 15 minutes. The distribution interruption information is updated by the CPU 22. In this case, the CPU 22 acts as update means.

Even when contents are not distributed in real time in step S24, in step S29 distribution information is loaded at a specified speed and distributed. In this case, there is no necessity of catching up with the time of real-time distribution. Hence, distribution information may be loaded at the same output speed as that at which contents are distributed in real time. In short, a specified loading speed may be set so as to become slower than the case set forth.

If in step S28 there is no delay in distribution information and a distribution end flag is OFF, processing proceeds to step S30, where the mode returns to a real-time distribution mode. More specifically, the compression processing section 12 compresses distribution information (S30), and distribution information is stored in the storage section 14 (S31). The thus-compressed distribution information is distributed (S32). In step S30, the distribution information entered byway of the input section 60 is in principle compressed. In this case, contents are distributed at normal speed; that is, in real time. For example, information to be distributed is loaded at high speed and transmitted, and the information that has been transmitted to the distribution information receiver B has caught up with real-time distribution. In such a case, processing proceeds from step S28 to step S30. High-speed loading and delivery are stopped, and real-time distribution is effected. The CPU 22 performs control operation for switching high-speed transmission to real-time distribution. In this case, the CPU 22 acts as switching means.

When processing has proceeded from steps S30 and S31, processing pertaining to step S33 is skipped, since updating of distribution interruption information is not necessary.

As in the case of step S14, in step S34 a determination is made as to whether or not interruption has arisen. If interruption has arisen, distribution interruption information is stored in the interruption information table, as in the case of step S16. In contrast, if no interruption has arisen, processing pertaining to step S28 and subsequent steps is continued until distribution is completed (S35). Particularly, high-speed loading and distribution operations are continued until the distribution time information catches up with the time of real-time distribution. Specifically, unless otherwise interrupted, processing pertaining to steps S28, S29, S32, and S33 is performed until the distribution time information catches up with the time of real-time distribution. In this way, unless otherwise interrupted, distribution information is loaded at a specified speed until distribution information is distributed to its end. Further, distribution interruption information is updated every time a predetermined volume of distribution information is distributed. In a case where distribution interruption information is updated every time distribution information for a predetermined period of time is transmitted, unless otherwise interrupted distribution information is naturally loaded at a specified speed until distribution information is distributed to its end, and distribution interruption information is updated every time distribution information for a predetermined period of time is distributed.

When the distribution interruption information is updated in step S33, the distribution information is read from a memory location in the storage section 14 which indicated by the updated time stamp at following step S29.

When in step S22 it is determined that no re-distribution request has been issued, a contents number is detected from the distribution interruption information (S37). A determination is made as to whether or not contents corresponding to the contents number are in the course of being distributed in real time (S38). More specifically, a determination is made as to whether or not contents corresponding to the acquired client ID are in the course of being distributed in real time. If the contents are in the course of being distributed in real time, processing proceeds to step S30. In contrast, if the contents are not being distributed in real time, the contents are considered to have been completed. Hence, processing is terminated.

In relation to the distribution information receiver B, when distribution information is distributed by way of the communications control section 62, the expansion processing section 64 expands the distribution information. The thus-expanded distribution information is output from the output section 66.

A specific example of the processing shown in FIGS. 5, 6 and 7 will now be described by reference to a case shown in FIG. 8. The case shown in FIG. 8 relates to a case where certain contents had been distributed for 10 minutes without interruption and where distribution of the contents was interrupted at a point in time when 10 minutes have elapsed and resumed at a point of time when 15 minutes have elapsed.

In this case, processing proceeds from step S10 to step S15 until 10 minutes have elapsed, by way of steps S11 through S14. Subsequently, processing pertaining to steps S12 through S15 is iterated. Since distribution was interrupted at a point in time when 10 minutes have elapsed, distribution interruption information is stored (S16). In other words, information is stored in the interruption information table. In this case, since the contents are in the course of being distributed, the distribution end flag stored in the interruption information table is OFF.

When a re-distribution request is issued at a point in time when 15 minutes have elapsed, the contents are still in the course of being distributed in real time. Hence, processing proceeds sequentially from step S25 to step S29 by way of steps S26 and S28. Distribution information is loaded at a specified speed and distributed. In this case, data for 10 minutes from a point in time when 10 minutes have elapsed to a point in time when 20 minutes have elapsed are stored in 5 minutes. Hence, the data are loaded so that the data can be distributed at double speed.

Since the delay in distribution information is cleared from a point in time when 20 minutes have elapsed, processing proceeds from step S28 to step S30, where real-time distribution is performed.

A certain period of time is required from when a re-distribution request has been issued until distribution information is sent. Hence, in the case of the foregoing example, when a re-distribution request has been issued after lapse of 15 minutes, a slight time lag can be said to be required in reality until re-distribution of information is performed.

In connection with the example shown in FIG. 8, assume that the overall distribution time is 25 minutes and distribution has been interrupted at a point in time when 10 minutes have elapsed. In a case where an attempt is made to finish transmission of distribution information performed at the specified speed, at a point in time when 25 minutes have elapsed, at which real-time distribution of contents to be transmitted will just end, T1/T2=1.5, because the remaining distribution time T1 of the contents is 15 minutes and time T2 from when re-distribution of contents is started until real-time distribution of contents is completed is 10 minutes. The only requirement is to load contents at a speed 1.5 times the speed at which contents are distributed in real time and to transmit the distribution information to the distribution information receiver B.

Although the case shown in FIG. 8 has been described on a per-minute basis for the sake of simplifying explanations, processing is actually performed on a per-second basis, on a per-one-tenth-second basis, or on a per-one-hundredth-second basis.

As mentioned above, in relation to the distribution information transceiver system according to the embodiment, contents are re-transmitted at a point in time when interruption has arisen in response to a re-transmission request, even if interruption has arisen in the course of transmission of distribution information. Hence, a user can view the contents corresponding to a period of time during which transmission of contents has been interrupted. Further, recorded distribution information is transmitted at high speed until operation has caught up to the time of real-time distribution. Hence, once operation has caught up to real-time distribution of contents, the user can view contents which are distributed in real time.

The above embodiment has described a case where distribution information is transmitted at high speed to the distribution information receiver B, by means of loading distribution information at high speed from the storage section 14. Distribution information may be transmitted at high speed by means of increasing a transmission rate over the same channel and at the same loading speed. In other words, a transmission rate is increased over the communication channel at the time of re-transmission relative to that employed in real-time transmission of distribution information, thereby enabling high-speed transmission of distribution information and transmission of distribution information at a speed faster than that at which distribution information is distributed in real time. As a result, the contents which have been distributed for a time "n" through real-time transmission can be distributed at a time of "m" (m<n).

For sending distribution information at a speed faster than that at which distribution information is sent in real time is conceivable in two situations, two methods are conceivable: that is, a method of loading distribution information at a high speed as mentioned above, and another method of increasing a transfer rate over a communications channel.

Further, high-speed transmission of distribution information to the distribution information receiver B may be performed, by combination of high-speed reading operation and high-speed transmission over the single communications channel. In other words, at the time of re-transmission of distribution information, a loading speed is increased relative to that employed in real-time distribution, and transfer rate over the communications channel is increased, thereby effecting high-speed transmission of distribution information.

What is claimed is:

1. An information distribution apparatus for transmitting distribution information as real-time information, comprising:

distribution means for transmitting the distribution information in real time to a receiver terminal;

distribution information storage means for separately storing the distribution information to be transmitted by the distribution information;

interruption information storage means which, in the event that transmission of distribution information from the distribution means to a certain receiving terminal is interrupted, stores specific information for specifying a position on the distribution information where interruption has arisen; and re-distribution means which, in response to a request from the receiving terminal, loads from the distribution information storage means partial information which constitutes a portion of the distribution information stored in the distribution information storage means and is subsequent to a position specified by specific information that is stored in the interruption information storage means, and which transmits the partial information.

2. The information distribution apparatus according to claim 1, wherein the re-distribution means transmits the partial information at a speed faster than that at which the distribution means transmits distribution information in real time.

3. The information distribution apparatus according to claim 1, wherein the information distribution apparatus further comprises interruption sensing means for sensing that transmission of distribution information from the distribution means to a certain receiving terminal has been interrupted; and wherein, when the sensing means has sensed occurrence of interruption in transmission, the interruption information storage means stores specific information for specifying a position on the distribution information where interruption has arisen.

4. The information distribution apparatus according to claim 1, wherein the specific information for specifying a position on distribution information where interruption has arisen is stored in the interruption information storage means, in association with receiver information for specifying a receiver and distribution information specification information for specifying interrupted distribution information; and, when a re-distribution request has been issued by the receiving terminal, the re-distribution means detects the distribution information specification information in accordance with the receiver information output from the receiving terminal and transmits the partial information pertaining to the distribution information specified by the distribution information specification information.

5. The information distribution apparatus according to claim 2, further comprising:

time information sensing means for sensing time information pertaining to when the distribution information is distributed in real time; and changeover means which stops re-distribution operation performed by the re-distribution means and switches operation to real-time distribution by means of the distribution means when time information pertaining to the distribution information that has already been distributed by means of the re-distribution means has caught up with time information pertaining to real-time distribution sensed by the sensing means, as a result of re-transmission of distribution information performed by the re-distribution means.

6. The information distribution apparatus according to claim 2, wherein the information distribution apparatus further includes update means for updating specific information stored in the interruption information storage means to time information about the distribution information that has already been distributed by the re-distribution means.

7. The information distribution apparatus according to claim 2, wherein the re-distribution means transmits an undistributed portion of the distribution information stemming from interruption such that transmission of the distribution information is completed when real-time transmission of the distribution information performed by the distribution means ends.

8. An information distribution apparatus for transmitting distribution information as real-time information, comprising:

input means for entering the distribution information;

distribution means for transmitting in real time to a receiving end the distribution information that has been entered by way of the input means to a receiver terminal;

distribution information storage means for separately storing the distribution information that has been entered by way of the input means;

interruption information storage means which, in the event that transmission of distribution information from the distribution means to a certain receiving terminal is interrupted, stores specific information for specifying a position on the distribution information where interruption has arisen; and re-distribution means which, in response to a request from the receiving terminal, loads from the distribution information means partial information which constitutes a portion of the distribution information stored in the distribution information storage means and is subsequent to a position specified by specific information that is stored in the interruption information storage means, and which transmits the partial information.

9. The information distribution apparatus according to claim 8, wherein the re-distribution means transmits the partial information at a speed faster than that at which the distribution means distributes distribution information in real time.

10. The information distribution apparatus according to claim 8, further comprising:

time information sensing means for sensing time information pertaining to when the distribution information is distributed in real time; and changeover means which stops re-distribution operation performed by the re-distribution means and switches operation to real-time distribution by means of the distribution means when time information pertaining to the distribution information that has already been distributed by means of the re-distribution means has caught up with time information pertaining to real-time distribution sensed by the sensing means, as a result of re-transmission of distribution information performed by the re-distribution means.

11. An information distribution apparatus for transmitting distribution information as real-time information, comprising:

input means for entering the distribution information;

distribution means for transmitting the distribution information to a receiving end;

distribution information storage means for separately storing the distribution information that has been entered by way of the input means;

interruption information storage means which, in the event that transmission of distribution information from the distribution means to a certain receiving terminal is interrupted, stores specific information for specifying a position on the distribution information where interruption has arisen; and a controller which stores into the distribution information storage means the distribution information that has been input by way of the input means and controls the distribution means so as to transmit the distribution information in real time when transmission of the distribution information to the receiving terminal is not interrupted; and which stores the specific information into the interruption information storage means when transmission of distribution information to a certain receiving terminal is interrupted, which loads, when a request is issued by the receiving terminal, partial information from the distribution information storage means, the partial information constituting a portion of the distribution information stored in the distribution information storage means and being subsequent to a position specified by specific information stored in the interruption information storage means, and which controls the distribution device so as to distribute the partial information.

12. The information distribution apparatus according to claim 11, wherein the controller loads partial information from the distribution information storage means at a speed faster than that at which distribution information is to be transmitted in real time.

13. The information distribution apparatus according to claim 11, wherein the controller controls the distribution means such that partial information is transmitted at a speed faster than that at which the distribution information is to be transmitted in real time.

14. The information distribution apparatus according to claim 11, wherein the controller has a function of sensing that transmission of distribution information from the distribution means to a certain receiving terminal has been interrupted; and wherein, when having detected that transmission has been interrupted, the controller stores, into the interruption information storage means, specific information for specifying an interrupted position on the distribution information.

15. The information distribution apparatus according to claim 11, wherein, when storing the specific information into the interruption information storage means, the controller stores the specific information in association with receiver information for specifying a receiver and distribution information specific information for specifying interrupted distribution information; and wherein, when a re-transmission request has been issued by the receiving terminal, the controller detects the specified distribution information in accordance with the receiver information output from the receiving end and information stored in the interruption information storage means and transmits the partial information about the specified distribution information.

16. The information distribution apparatus according to claim 12, wherein, when loading the partial information from the distribution information storage means, the controller decimates the partial information.

17. The information distribution apparatus according to claim 12, wherein, when time information about the distribution information that has already been transmitted by the distribution means has caught up with time information about the distribution information which is transmitted in real time, as distribution of the partial information, the controller stops distribution of the partial information and switches operation to real-time distribution of the same.

18. The information distribution apparatus according to claim 12, wherein, when a portion of the partial information has been transmitted, the controller updates specific information stored in the interruption information storage means to time information pertaining to the end position of the partial information.

19. The information distribution apparatus according to claim 12, wherein the controller loads partial information from the distribution information storage means such that distribution of an undistributed portion of the transmission-interrupted distribution information ends when real-time transmission of the distribution information performed by the distribution means is completed.

20. The information distribution apparatus according to claim 14, wherein, when, as a result of distribution of the partial information, time information about the distribution information that has already been distributed by the distribution means has caught up with time information about real-time transmission of the distribution information, the controller stops distribution of the partial information and performs switching operation so as to distribute distribution information in real time.

21. The information distribution apparatus according to claim 14, wherein, when the partial information has been partially transmitted, the controller updates the specific information stored in the interruption information storage means to time information pertaining to an end position of the partial information.

22. The information distribution apparatus according to claim 14, wherein the controller controls the distribution means such that distribution of an undistributed portion of the transmission-interrupted distribution information ends when real-time transmission of the distribution information performed by the distribution means is completed.

23. An information distribution apparatus for transmitting distribution information as real-time information, comprising:

distribution means for transmitting the distribution information to a receiving end;

distribution information storage means for separately storing the distribution information that has been entered by way of the distribution means;

interruption information storage means which, in the event that transmission of distribution information from the distribution means to a certain receiving terminal is interrupted, stores specific information for specifying a position on the distribution information where interruption has arisen; and a controller which stores into the distribution information storage means the distribution information that has been input by way of the input means and controls the distribution means so as to transmit the distribution information in real time when transmission of the distribution information to the receiving terminal is not interrupted; and which stores the specific information into the interruption information storage means when transmission of distribution information to a certain receiving terminal is interrupted, which loads, when a request is issued by the receiving terminal, partial information from the distribution information storage means, the partial information constituting a portion of the distribution information stored in the distribution information storage means and being subsequent to a position specified by specific information stored in the interruption information storage means, and which controls the distribution device so as to distribute the partial information.

24. The information distribution apparatus according to claim 23, wherein the controller loads partial information from the distribution information storage means at a speed faster than that at which the distribution information is to be transmitted in real time.

25. The information distribution apparatus according to claim 23, wherein the controller controls the distribution means such that partial information is transmitted at a speed faster than that at which the distribution information is to be transmitted in real time.

26. The information distribution apparatus according to claim 24, wherein, when loading the partial information from the distribution information storage means, the controller decimates the partial information.

27. The information distribution apparatus according to claim 24, wherein, when, as a result of distribution of the partial information, time information about the distribution information that has already been distributed by the distribution means has caught up with time information about real-time transmission of the distribution information, the controller stops distribution of the partial information and performs switching operation so as to distribute distribution information in real time.

28. The information distribution apparatus according to claim 25, wherein, when, as a result of distribution of the partial information, time information about the distribution information that has already been distributed by the distribution means has caught up with time information about real-time transmission of the distribution information, the controller stops distribution of the partial information and performs switching operation so as to distribute distribution information in real time.

* * * * *